United States Patent
Yamatsu et al.

[11] Patent Number: 6,048,669
[45] Date of Patent: Apr. 11, 2000

[54] EXPOSURE RECORDING METHOD FOR OPTICAL RECORDING MATERIALS

[75] Inventors: Hisayuki Yamatsu, Tokyo; Minoru Takeda, Kanagawa; Motohiro Furuki, Tokyo, all of Japan

[73] Assignee: Sony Corporation, Tokyo, Japan

[21] Appl. No.: 09/112,946

[22] Filed: Jul. 10, 1998

[30] Foreign Application Priority Data

Jul. 11, 1997 [JP] Japan ................................ 9-186706

[51] Int. Cl.[7] ........................................ G11B 7/26
[52] U.S. Cl. .................. 430/321; 430/320; 430/945; 369/84
[58] Field of Search ................... 430/321, 320, 430/945; 369/84; 355/77

[56] References Cited

U.S. PATENT DOCUMENTS

| | | | |
|---|---|---|---|
| 4,943,126 | 7/1990 | Lang et al. | 359/12 |
| 5,105,404 | 4/1992 | Ohira et al. | 369/109 |
| 5,191,565 | 3/1993 | Inoue et al. | 369/284 |
| 5,330,880 | 7/1994 | Horigome et al. | 430/321 |
| 5,384,758 | 1/1995 | Matsumoto et al. | 369/288 |
| 5,399,461 | 3/1995 | Yan et al. | 430/321 |
| 5,559,338 | 9/1996 | Elliott et al. | 250/492.1 |
| 5,652,645 | 7/1997 | Jain | 355/53 |
| 5,780,566 | 7/1988 | Mertesdorf et al. | 430/270.1 |
| 5,811,211 | 9/1998 | Tanaka et al. | 430/322 |
| 5,852,508 | 12/1998 | Kubota et al. | 359/355 |

FOREIGN PATENT DOCUMENTS

| | | |
|---|---|---|
| 0 596 439 | 5/1994 | European Pat. Off. . |
| 0 596 439 A2 | 5/1994 | European Pat. Off. . |

OTHER PUBLICATIONS

Patent Abstracts of Japan, vol. 016, No. 225, (P–1360) May 26, 1992 and JP–A–04 047542 (Mitsubishi Electric Corp.), Feb. 17, 1992.

N. D. McMurdie, et al., *Advances in Resist Technology and Processing XIII*, Santa Clara, CA, USA Mar. 11–13, 1996, Proc. SPIE–Int. Soc. Opt. Eng. (USA), Proceedings of the SPIE—The International Society of Optical Engineering 1996, XP002079214, pp. 308–314.

*Primary Examiner*—Martin Angebranndt
*Attorney, Agent, or Firm*—Hill & Simpson

[57] ABSTRACT

In an exposure device 20 for an optical disc master disc, the power density of light beam which is converged until the diffraction limit level by using a light source laser 1 of far ultraviolet radiation and an objective lens 7 having a numerical aperture of 0.85 or more is set to $4\upsilon \times 10^2$ W/cm$^2$ or more ($\upsilon$)[cm/sec] represents a linear velocity of recording), and a photoresist 8 on the master disc 9 of the optical disc is subjected to light exposure and heat treatment at the same time.

7 Claims, 3 Drawing Sheets

EXPOSURE RECORDING METHOD FOR OPTICAL RECORDING MATERIALS

BACKGROUND OF THE INVENTION

The present invention relates to an exposure recording method for optical recording materials, and more particularly to an exposure recording method for optical recording materials which is characterized by a photoresist-film exposure recording method using light beams.

High integration design has been increasingly promoted and the wavelength of exposure light has been promoted to be shortened in a patterning process of semiconductor devices which has acted as a leadership in a photolithography field. As a result, a far ultraviolet radiation exposure recording operation based on an excimer laser such as KrF, ArF or the like has been recently carried out. So-called novolak resists have been hitherto utilized for an exposure recording operation in a visible region and a near ultraviolet radiation region. However, chemically amplified photoresists have been recently used in place of the novolak resists because the sensitivity of the novolak resists is remarkably reduced.

A representative example of the chemically amplified photoresists will be described with reference to FIG. 1. FIG. 1 shows a polymer in which a hydroxyl group of polyvinyl phenol is protected by a tert-butoxycarbonyl group and a photochemical reaction process of a chemically amplified photoresist formed of a photo acid generator (PAG).

The chemically amplified photoresist is formed of the polymer and the photo acid generator. According to an exposure recording method using the chemically amplified photoresist, the photo acid generator is exposed to light to generate acid, the acid thus generated is thermally diffused by a heat treatment to induce reaction of the polymer, and solubility to developing liquid is varied to form a pattern. The acid which is generated in the exposure process reforms the alkali-insoluble polymer into alkali-soluble material under a heating condition. That is, the exposed portion serves as a positive type resist which is removed in a developing process. Accordingly, when the chemically amplified photoresist is used, the heat treatment process after the exposure process is indispensable, and many steps in connection with the heat treatment are needed.

Further, it is known that the sensitivity of the chemically amplified photoresists is generally instable and it is more difficult to handle these photoresists than the novolak photoresists. One of causes resides in that the diffusion of the acid generated in the exposure process is suppressed by ammonium, etc. in the air before the heat treatment process is carried out. It is needless to say that the degree of the inactivation is dependent on the time period from the exposure process until the heat treatment process.

Accordingly, in the case where exposure recording is carried out on the chemically amplified photoresists by using a far ultraviolet radiation source, a severe time management is needed during the time period from the exposure process until the heat treatment process without being limited to the patterning process of semiconductor devices. However, when recording is successively carried out by using focused light beams in an exposure recording operation on a master disc of an optical disc, a light drawing operation, etc., there necessarily occurs a time difference between the exposure start time and the exposure end time. In some cases, this time difference extends to several times, and thus the patterning characteristic is greatly varied between the start time and the end time due to the sensitivity of the resist after the exposure process or the like. Therefore, it has been hitherto difficult to form excellent patterns.

SUMMARY OF THE INVENTION

The present invention has an object to provide an exposure recording method which can enhance productivity in a heat treatment process after an exposure process of a photoresist in the photolithography process in a far ultraviolet radiation region, and stabilize the characteristic of the photoresist after the exposure process.

In order to attain the above object, an exposure recording method for optical recording materials according to the present invention which comprises an exposure step for exposing a chemical amplification type photoresist or other types of photoresist to a light beam which is focused by an objective lens, and a heat treatment step for performing a heat treatment to reform an exposed portion of the photoresist after the exposure process, is characterized in that the power density of the light beam is set to $4\upsilon \times 10^2$ W/cm$^2$ ($\upsilon$[cm/sec] represents a linear velocity of recording) or more, and the exposure process and the heat treatment process are simultaneously carried out.

It is preferable that the numeral aperture NA of the objective lens is set to 0.85 or more, and the light source for emitting the light beam comprises an excimer laser for emitting light having a wavelength of 300 nm or less, or an all solid state laser for achieving forth harmonic generation of YAG laser by using a nonlinear optical crystal.

According to the above exposure recording method, in the photolithography using the light beam emitted from the light source of the far ultraviolet radiation region, the chemically amplified photoresist or the like is exposed to the light beam which is converged until a diffraction limit level by using an objective lens having a large numerical aperture and has a large power density, whereby the exposure process and the heat treatment process can be simultaneously carried out, whereby the heat treatment process after the exposure process is unnecessary.

Further, the patterning characteristic which is dependent on the time different from the exposure process to the heat treatment process is made excellent.

DESCRIPTION OF THE PREFERRED EMBODIMENTS

A preferred embodiment of the present invention will be described with reference to the accompanying drawings.

Figure 1:
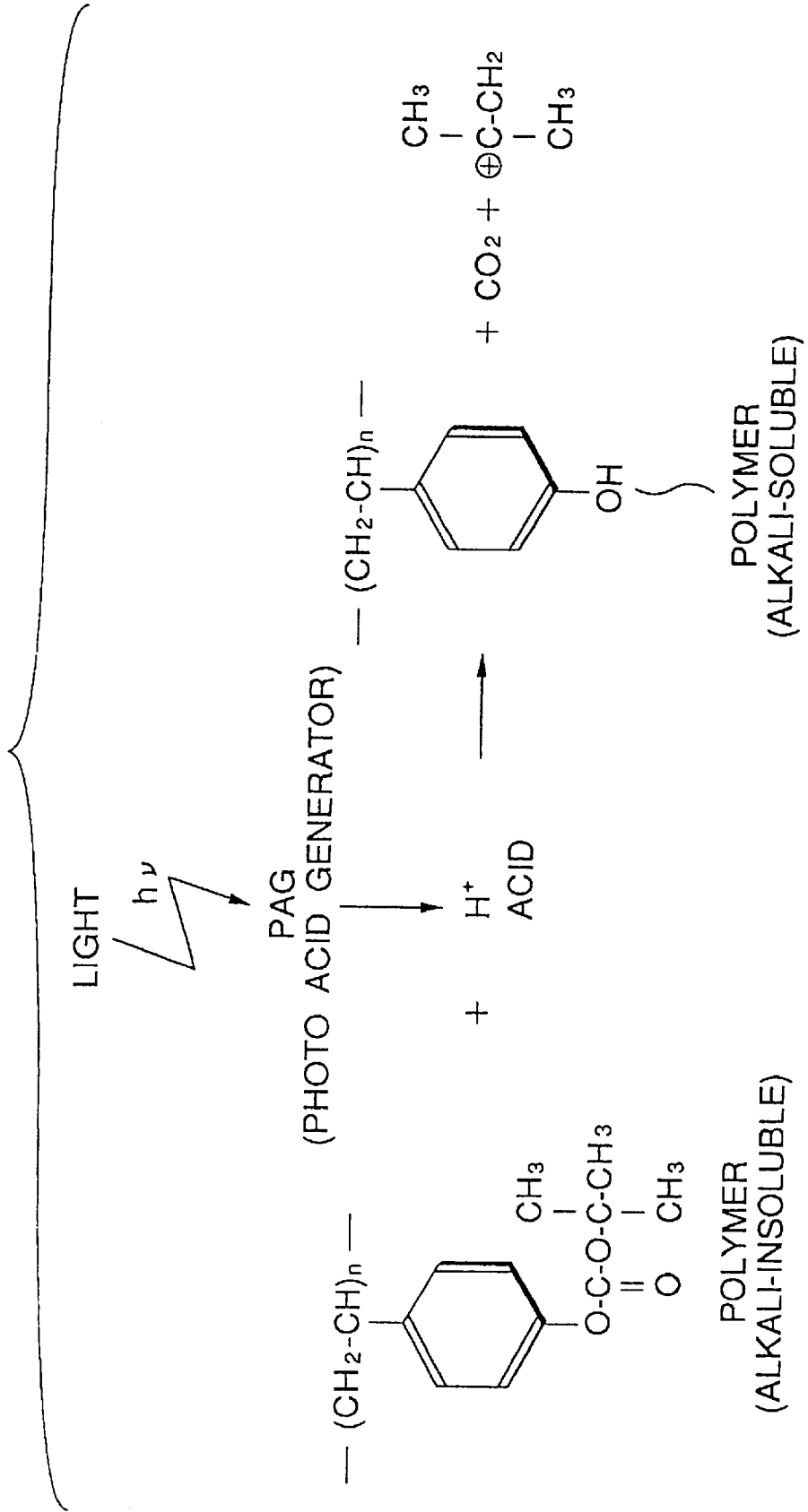
FIG. 1 is a diagram showing a chemical reaction formula which shows a photochemical reaction of a chemically amplified photoresist.
Figure 2:
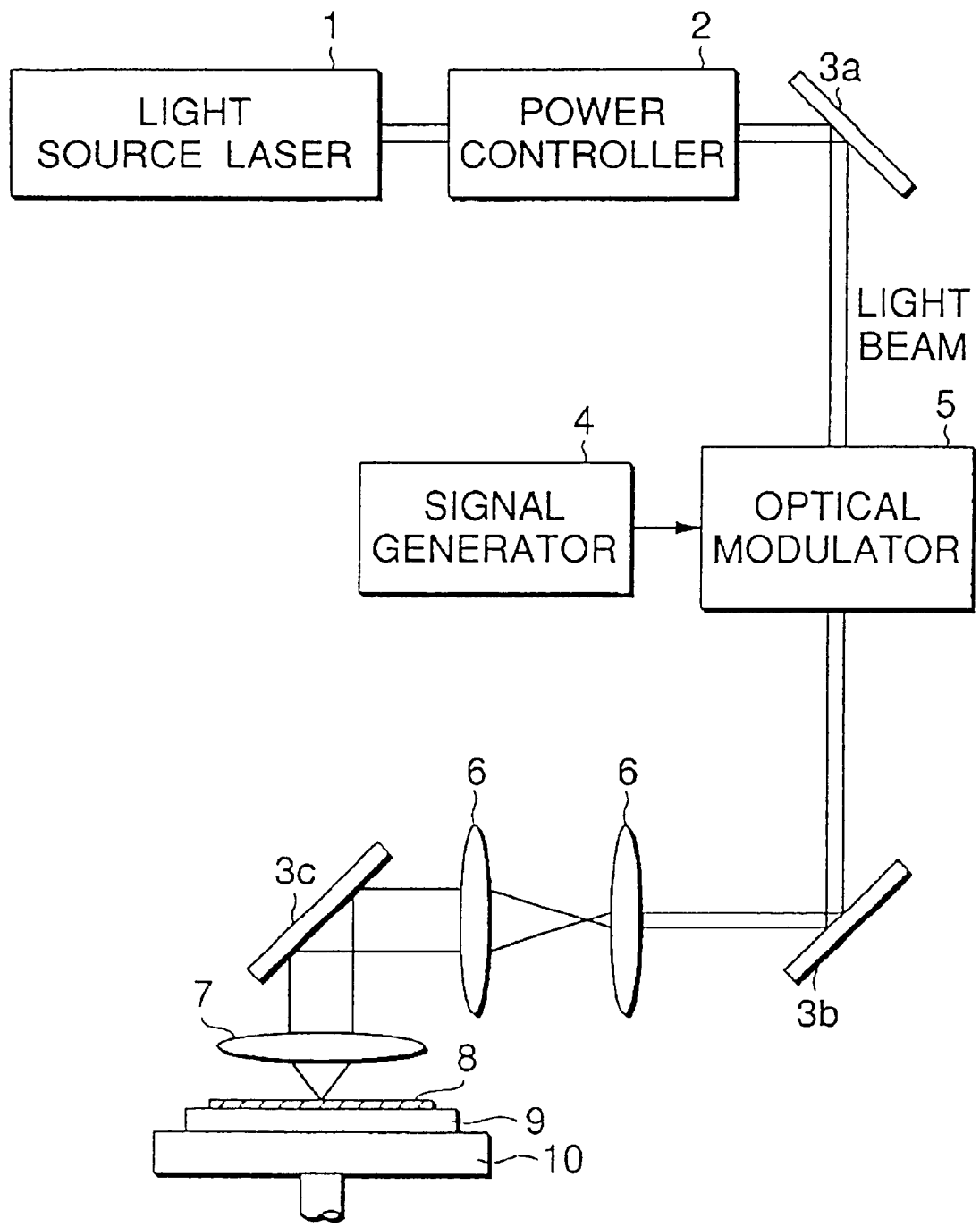
FIG. 2 is a diagram showing an exposure device for a master disc of an optical disc according to the present invention.

FIG. 2 is a diagram showing an exposure recording device for a master disc of an optical disc which uses a far ultraviolet radiation laser as a light source.

As a light source laser 1 is used an all solid state laser for performing forth harmonic generation of YAG laser by using non-linear optical crystal. The numerical aperture of an objective lens 7 is set to 0.85 or more.

A laser beam emitted from the light source laser 1 is transmitted through a power controller 2 comprising an electrooptical element, a polarizing beam splitter, a photodetector, etc., reflected by a first mirror 3a while the optical path thereof is bent by 90 degrees, and then enters a light modulator 5. In the light modulator 5, the laser beam is modulated with a signal which is supplied from a signal generator 4, and then reflected by a second mirror 3b while the optical path thereof is bent by 90 degrees. The laser beam is expanded by a beam expander comprising two or more lens 6 so that the spot diameter of the laser beam is equal to or larger than the entrance pupil diameter, reflected by a third mirror 3c so that the optical path thereof is bent by 90 degrees, enters the objective lens 7, and then irradiated onto the photoresist 8 at a large power density. The objective lens 7 whose numerical aperture is set to 0.85 or more is designed to be movable integrally with the third mirror 3c in a radial direction of the master disc 9 of the optical disc which is coated with the photoresist 8. The objective lens 7 is moved at a constant velocity while the master disc 9 of the optical disc is rotated on a turn table 10, thereby performing a spiral exposure recording operation.

Assuming that in the exposure recording operation of the master disc 9 of the optical disc, for example, a light source of 300 nm in wavelength is used and the spot diameter of the light beam which is converged by the objective lens 7 having the numerical aperture of 0.85 is equal to about $4 \times 10^{-5}$ cm, the exposure area per unit time is calculated into $(4 \times 10^{-5}$ cm$) \times \upsilon$ cm/sec, where $\upsilon$[cm/sec] represents a linear velocity of recording.

Accordingly, the power of recording far ultraviolet radiation after emitted from the objective lens 7 which achieves the light energy density of about $10^{-2}$ J/cm$^2$ which is generally needed when the exposure recording is carried out on the chemically amplified photoresist 8 with far ultraviolet radiation, is calculated into $(10^{-2}$ J/cm$^2) \times (4\upsilon \times 10^{-5}$ cm$^2$/sec), and thus $4\upsilon \times 10^{-7}$ W. Taking into consideration that the area of the light beam is in $10^{-9}$ cm$^2$ order, the power density of the recording far ultraviolet radiation is equal to $4\upsilon \times 10^{-7}$ [W] /$10^{-9}$ cm$^2$, and thus $4\upsilon \times 10^{2}$ [W/cm$^2$]. Usually, $\upsilon$ is set to $10^2$ to $10^3$ cm/sec, and thus the power density is equal to $4 \times 10^4$ to $4 \times 10^5$ [W/cm$^2$].

This value shows that the recording operation of the master disc of the optical disc needs very large power density unlike such a case that a stationary photoresist 8 is exposed to light, for example, in the case of a photolithography of semiconductor devices in which the recording power density is equal to about $10^{-1}$ [W/cm].

In the case where the exposure recording operation is carried out while the master disc 9 of the optical disc having the photoresist 8 thereon is rotated, a light beam of 300 nm or less in wavelength is used and the numerical aperture of the objective lens 7 is set to 0.85 or more, whereby the power density of a spot portion focused onto the photoresist 8 can be set to $1 \times 10^4$ [W/cm$^2$] or more.

Accordingly, by setting the power density to such a value, the photoresist 8 can be instantaneously heated to several tens to one hundred and several tens ° C.

Next, a heat analysis result of a temperature distribution when the exposure recording was carried out on an optical disc master disc 9 by using a chemically amplified photoresist 8 will be described hereunder.

There was carried out a simulation based on thermal analysis on a temperature distribution in the longitudinal direction of recording pits when a light beam of 266 nm in wavelength was converged on the chemically amplified photoresist 8 (for example, PEK 405 produced by Sumitomo Chemical Industries, Co., Ltd.) by an objective lens 7 having a numerical aperture of 0.9 to perform the exposure recording under the condition: recording power of $3.0 \times 10^{-4}$ W and recording linear velocity of 3.0 m/sec.

The power density of the light beam was equal to about $3.6 \times 10^{-5}$ cm because the spot diameter of the light beam can be expressed by the relational expression: $1.22 \times$ (wavelength/numerical aperture). Further, since the area of the light beam was equal to about $1 \times 10^{-9}$ cm$^2$, (the recording power $3 \times 10^{-4}$ W)/(light beam spot area $1 \times 10^{-9}$ cm$^2$) is equal to about $3 \times 10^5$ W/cm$^2$.

This calculation is applied to a case where the exposure recording is newly carried out on a pit when a pit of 340 nsec (exposed portion) and a land of 93 nsec (non-exposed portion) are repeated.

This corresponds to 11T pit and 3T land when recording of 10 GB capacity is carried out on an optical disc having a track pitch of 0.5 μm and a diameter of 12 cm by EFM modulation. The physical quantities used in this calculation are shown in the following Table 1, and in this case, air layer was considered as a non-conductor to heat.

[TABLE 1]

|  | Master disc of optical disc (glass) | Chemically amplified resist |
| --- | --- | --- |
| Specific heat(J/cm$^3$ · K) | 2.38 | 1.72 |
| Heat conductivity (J/cm.sec.K) | 0.0113 | 0.0115 |
| Refractivity, absorptance (n, k) | (1.6, 0.1) | (1.55, 0.055) |

Figure 3:
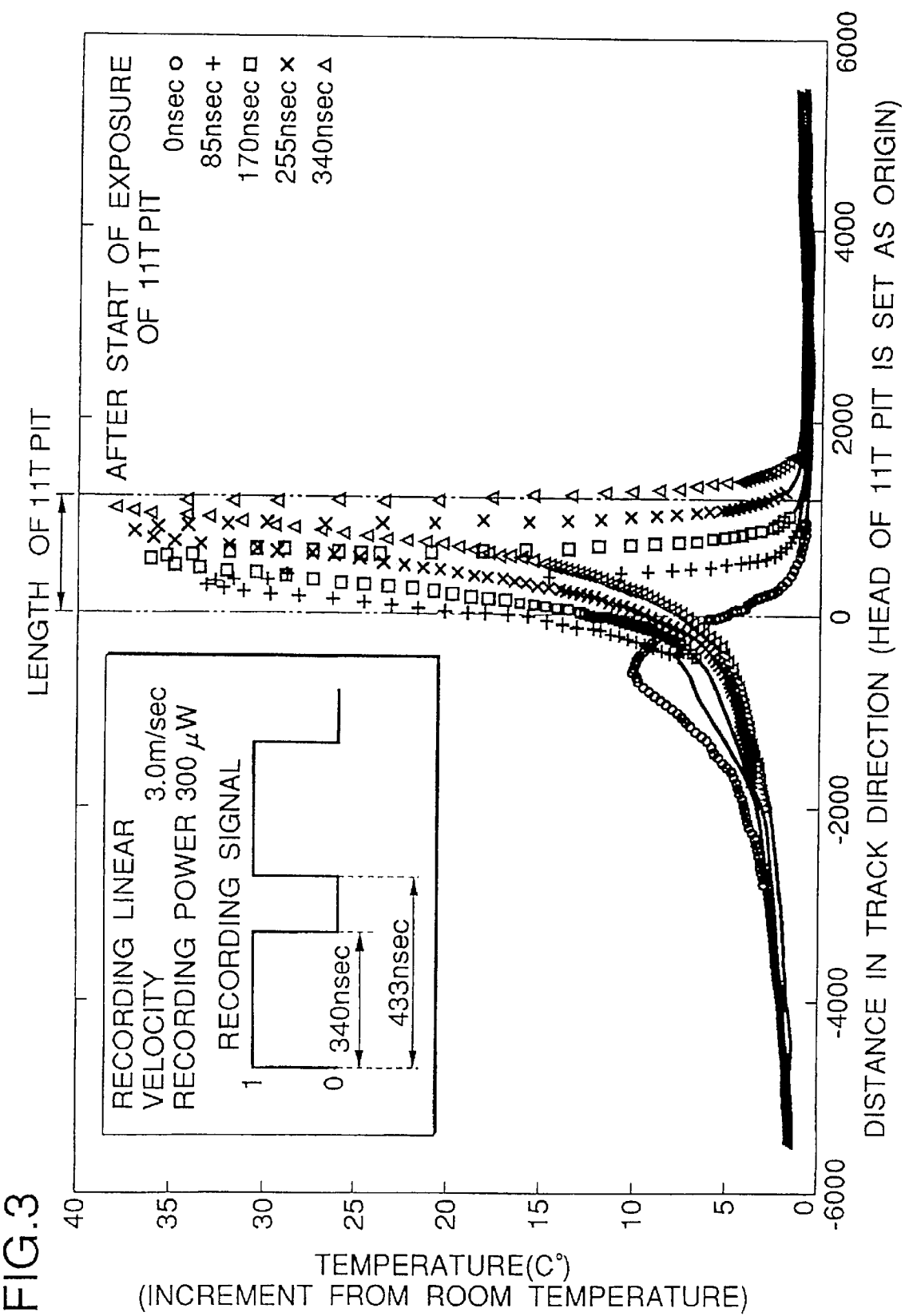
FIG. 3 is a graph showing a simulation result of a temperature distribution in a track direction in a pulse exposure recording operation according to the present invention.

FIG. 3 shows a simulation result of the temperature distribution in the track direction in the pulse exposure recording operation.

It is apparent from FIG. 3 that when the room temperature is set to 25° C., the temperature of the exposed portion of the photoresist 8 rises up to about 60° C. at maximum. In general, the minimum value of the heat treatment temperature after the exposure process is equal to about 50° C., so that if the temperature of the exposed portion of the photoresist rises up to 60° C. or more, this operation can sufficiently play the same role as the heat treatment process after the exposure process.

It is apparent from the simulation result that when the exposure recording is carried out on the chemically amplified photoresist 8 by the light beam which is converged until the diffraction limit level by the objective lens 7 having the numerical aperture of 0.85 or more as described above, the exposure process and the heat treatment process progress simultaneously, and thus the heat treatment process after the exposure process is unnecessary.

The above description is made on such a situation that the exposure recording operation is carried out on the master disc 9 of the optical disc on which the chemically amplified photoresist 8 is formed, however, the present invention may be applied to a photolithography for semiconductor devices.

What is claimed is:

1. An exposure recording method for effecting recording on an optical recording material using a chemically amplified photoresist which needs a heat treatment process to reform an exposed portion after the material has been subjected to a far UV exposure process using a light beam focused by an objective lens, said method characterized in that during recording a light beam is focused onto the photoresist by the objective lens and the light beam is moved with a relative linear velocity $\upsilon$ across a surface of the material at between $10^2$ and $10^3$ cm/sec and a power density of the light beam is set to $4\upsilon \times 10^2$ W/cm or more, the power density being above that necessary to produce a developable image thereby performing the exposure process and the heat treatment process simultaneously.

2. The exposure recording method as claimed in claim 1, wherein the wavelength of the light beam is set to 300 nm or less.

3. The exposure recording method as claimed in claim 2, wherein a light source for emitting the light beam is an excimer laser.

4. The exposure recording method as claimed in claim 2, wherein a light source for emitting the light beam is an all solid state laser using a nonlinear optical crystal which generates forth harmonic waves of a YAG laser beam.

5. The exposure recording method as claimed in claim 4, wherein said photoresist is formed on a semiconductor substrate.

6. An exposure recording method for effecting recording on an optical recording material using a chemically amplified photoresist which needs a heat treatment process to reform an exposed portion after the material has been subjected to a far UV exposure process using a light beam focused by an objective lens, said method characterized in that during recording the light beam is focused onto the photoresist by the objective lens and moved at a relative linear velocity $\upsilon$ across a surface of the material at between $10^2$ and $10^3$ cm/sec and a power density of the light beam is set to $4\upsilon \times 10^2$ W/cm or more, thereby performing the exposure prowess and the beat treatment process simultaneously the numerical aperture of said objective lens being set to 0.85 or more.

7. An exposure recording method for effecting recording on an optical recording material using a chemically amplified photoresist which needs a heat treatment process to reform an exposed portion after the material has been subjected to a far UV exposure process using a light beam focused by an objective lens, said method characterized in that the light beam is focused onto the photoresist by the objective lens and moved at a relative linear velocity $\upsilon$ across a surface of the material at between $10^2$ and $10^3$ cm/sec and a power density of the light beam is set to $4\upsilon \times 10^2$ W/cm or more, thereby performing the exposure process and the heat treatment process simultaneously, a light source for emitting the light beam being an all solid state laser using a nonlinear optical crystal which generates forth harmonic waves of a YAG laser beam, the wavelength of the light beam being set to 300 nm or less, said photoresist being formed on a master disc of an optical disc.

* * * * *